United States Patent [19]
Garwood

[11] 3,782,573
[45] Jan. 1, 1974

[54] BUCKET FOR USE ON A LOADER, TRACTOR OR THE LIKE

[75] Inventor: James R. Garwood, Troy, Ill.

[73] Assignee: National Oats Company, Inc., East St. Louis, Ill.

[22] Filed: May 28, 1971

[21] Appl. No.: 147,872

[52] U.S. Cl................... 214/768, 214/140, 214/145
[51] Int. Cl............................................... B66f 9/00
[58] Field of Search.................. 214/768, 145, 140, 214/146 R; 37/118

[56] References Cited
UNITED STATES PATENTS

| 3,034,237 | 5/1962 | Wolfe | 214/145 |
| 3,221,912 | 12/1965 | McWilliams | 214/514 |
| 3,158,273 | 11/1964 | Brown | 214/768 |
| 3,121,964 | 2/1964 | Cobb | 214/145 |

Primary Examiner—Gerald M. Forlenza
Assistant Examiner—John Mannix
Attorney—Koenig, Senniger, Powers and Leavitt

[57] ABSTRACT

A bucket for use on a loader, tractor or the like, having laterally extensible and retractible side sections, each of which is movable laterally in and out by means of a hydraulic cylinder on the back of the bucket, each cylinder being operable independently of the other for operating either side section independently of the other.

12 Claims, 5 Drawing Figures

PATENTED JAN 1 1974 3,782,573

James A. Garwood,
Inventor.
Koenig, Senniger,
Powers and Leavitt,
Attorneys.

BUCKET FOR USE ON A LOADER, TRACTOR OR THE LIKE

BACKGROUND OF THE INVENTION

This invention relates to a bucket for use on a loader or the like, and more particularly to a bucket for use on a loader for gathering and loading litter from underneath poultry cages or for other purposes.

In commercial poultry growing operations, it is conventional to raise the poultry in long rows of cages supported above the ground, the cages having open-mesh floors to permit poultry litter to drop through to the ground below. The cages are generally arranged in spaced rows with aisles therebetween which permit travel of a vehicle between the rows for removing the litter or other purposes. This invention is especially concerned with a special bucket for use on a loader or tractor for removing the litter, the bucket also being usable, of course, for other purposes, e.g., as a backhoe bucket. Reference may be made to U.S. Pat. No. 3,039,630 for a showing of a prior bucket particularly for litter-removing purposes, upon which the bucket of this invention is an improvement.

SUMMARY OF THE INVENTION

Among the several objects of this invention may be noted the provision of an improved adjustable bucket of the class described; the provision of such a bucket adapted for use on a loader enabling cleanout of litter from beneath two adjacent rows of cages by driving the loader down the aisle between the rows; the provision of such a bucket which is also useful for cleanout of litter from beneath a single row of cages; the provision of such a bucket adapted for lateral linear withdrawal of scooped-up litter from beneath the cages as distinguished from pivotal withdrawal; and the provision of such a bucket which is of economical construction and easy to use.

In general, a bucket of this invention for use on a loader, tractor or the like, comprises a main section having a bottom plate and a back plate extending up from the back edge of the bottom plate, and side scoops on each lateral side of the main section, each side scoop having a bottom plate, a back plate extending up from the bottom plate, and an outer end plate extending up from the bottom plate and forward from the back plate. The implement further includes means mounting each side scoop for effecting sliding movement laterally inward and outward of each said scoop relative to the main section between a retracted position wherein the bottom plate of a respective scoop overlies the bottom plate of the main section, the scoop back plate lies in front of the main section back plate, and the outer end plate is adjacent a respective main section outer end, and an extended position wherein the innermost portion of the scoop bottom plate overlies the outer portion of the main section bottom plate, the innermost portion of the scoop back plate lies in front of the outermost portion of the main section back plate, and the outer end wall lies laterally outward from its respective main section outer end.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
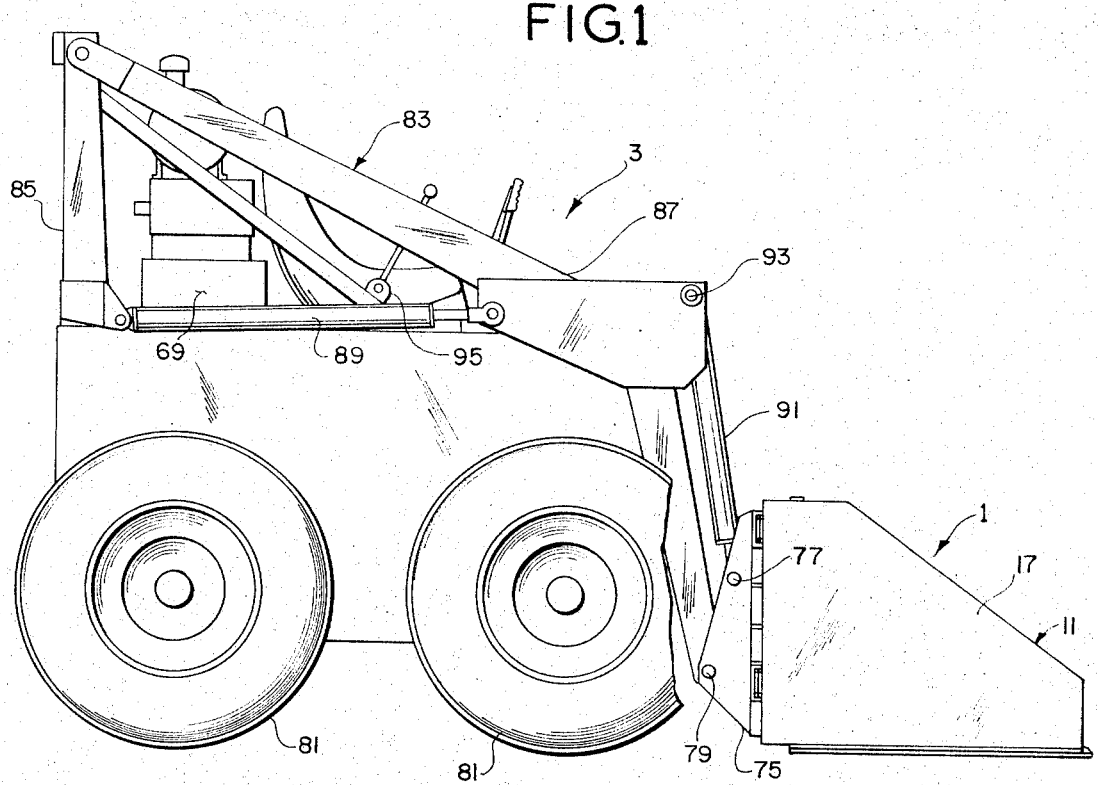
FIG. 1 is a side elevation of a loader carrying a bucket of this invention.

Referring now to the drawings, a gathering and loading implement or bucket of this invention, indicated in its entirety at 1, for use on a loader or tractor, generally indicated at 3, includes a main bucket section generally indicated at 5 having a bottom plate 7 and a back plate 9 extending up from the back edge of the bottom plate. A pair of side scoops, each generally indicated at 11, are mounted at opposite sides of the main section. Each side scoop 11 has a bottom plate 13, a back plate 15 extending up from the bottom plate 13, and an outer end plate 17 extending up from the bottom plate 13 and forward from the back plate 15. The bucket includes means generally indicated at 19 mounting each side scoop 11 for effecting sliding movement laterally inward and outward of each scoop relative to the main bucket section 5 between a retracted position (the position of the left-hand scoop in FIG. 2) wherein the scoops are relatively closely adjacent one another and wherein the bottom scoop plate 13 overlies the main section bottom plate 7, the back scoop plate 15 lies in front of the main section back plate 9, and the scoop outer end plate 17 is adjacent its respective main section lateral side, and an extended position (the position of the right-hand scoop in FIG. 2 and both scoops in FIG. 5) wherein the scoops are relatively widely spaced apart and wherein the innermost portion of the scoop bottom plate 13 overlies the outer portion of the main section bottom plate 7, the innermost portion of the scoop back plate 15 lies in front of the outer portion of the main section back plate 9, and the scoop outer end wall 17 lies laterally outward from the respective main section lateral side.

Figure 5:
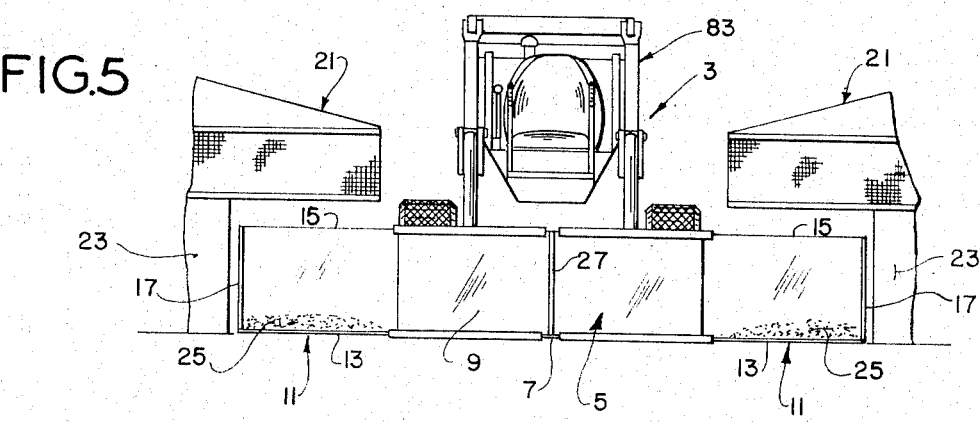
FIG. 5 is a front elevation of FIG. 1 on a smaller scale showing both side scoops extended to simultaneously gather and load litter from under two adjacent rows of poultry cages.

Commercial growers generally raise poultry in wire cages such as indicated at 21 arranged in long, parallel rows supported above the ground by a plurality of center cage posts 23 so that the outer lateral portions of the cages overhang the ground. The rows of cages are spaced apart from one another a distance sufficient to permit various vehicles to pass between the adjacent rows for feeding and cleaning purposes. The cages 21 have open mesh wire floors to permit the poultry litter to drop to the ground below. As shown in FIG. 5, a bucket of this invention is particularly adapted to gather and to load the litter which has accumulated under the cages. Additionally, the bucket may be used as a conventional bucket to load dirt, snow and the like when not being used to gather and load poultry litter.

Figure 4:
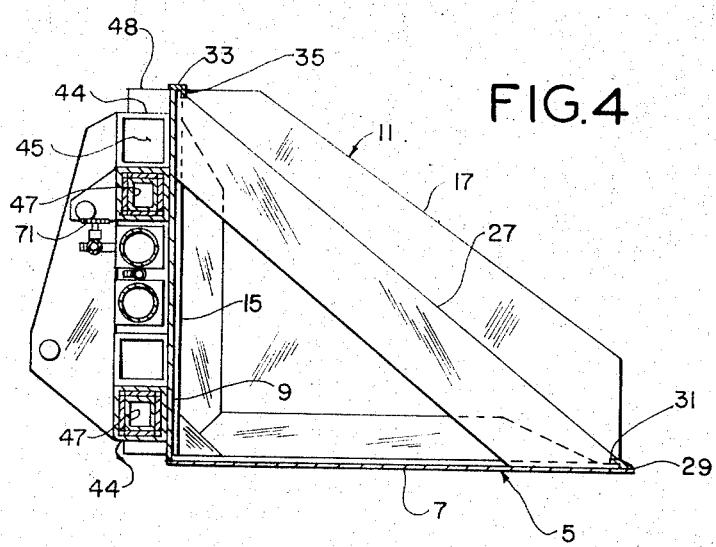
FIG. 4 is a vertical section on line 4—4 of FIG. 3.

Referring to FIG. 5, the width of the main bucket section 5 is such that with the side scoops 11 in their retracted position, the bucket may be readily moved between two adjacent rows of cages 23. More particularly, the main bucket section 5, as shown in FIG. 4, has back plate 9 welded to and extending up from the back edge of bottom plate 7. An inclined brace 27 is welded to the front center portion of the bottom plate 7 and extends upwardly and rearwardly to the upper center portion of the back plate 9 and is welded thereto. The brace stiffens the main section and supports the forward edge of the bottom plate during scraping and lifting. The front edge of the main section bottom plate has two inclined edge members 29 secured thereto facilitating scraping as the bucket is moved forward by the loader. Each edge member 29 has an upper section 31 extending back over and spaced above the upper front surface of the main section bottom plate 7 engaging the upper front surface of a respective scoop bottom plate 13 for holding the scoop bottom plate in its position overlying the main section bottom plate as the scoops are moved in and out and as the bucket is scraped along the ground by the loader. An upper holding bar 33 is welded to the upper edge of the main section back plate 9 extending over the upper edge of the scoop back plate 15. The holding bar has a downwardly extending portion 35 spaced forward of the main section back plate engaging the upper front portion of the scoop back plate 15 for holding the scoop back plate in its proper position immediately in front of the main section back plate as the scoops are moved in and out and as the bucket is scraped along the ground.

Figure 2:
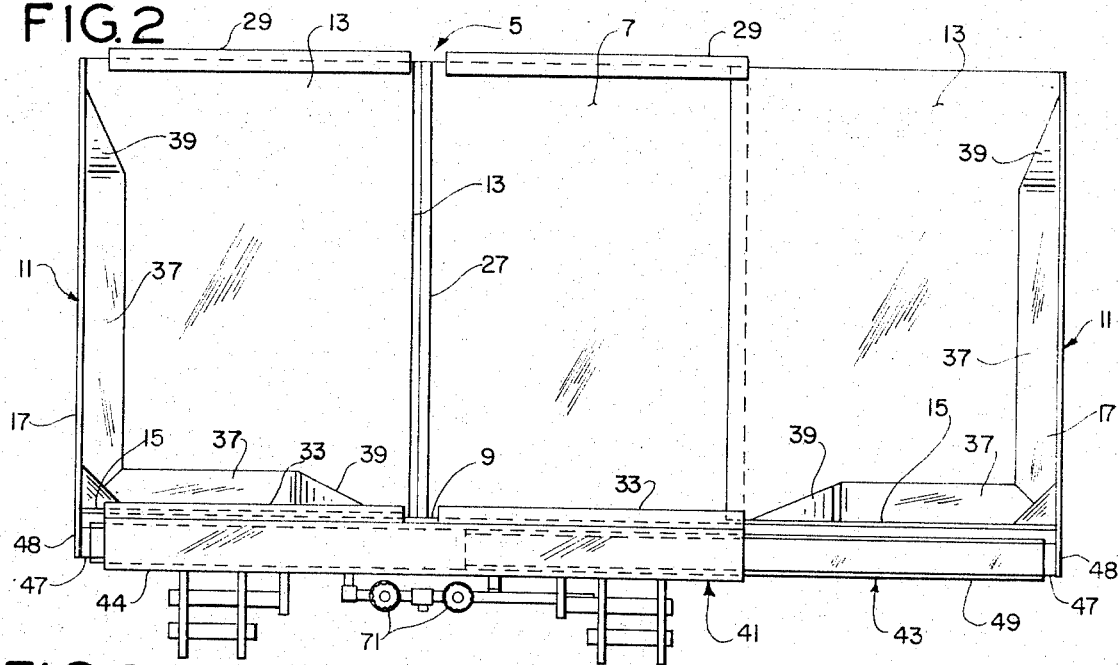
FIG. 2 is a plan view of the bucket with its right-hand scoop in its extended position and its left-hand scoop in its retracted position.

As shown in FIG. 2, the corners of the scoops formed by the intersection of the scoop bottom, back and outer end plates are reinforced by angled gusset members 37 welded to the plates. The ends of the gusset members are closed as indicated at 39 to prevent dirt from becoming entrapped between the gusset members and the scoop plates.

Figure 3:
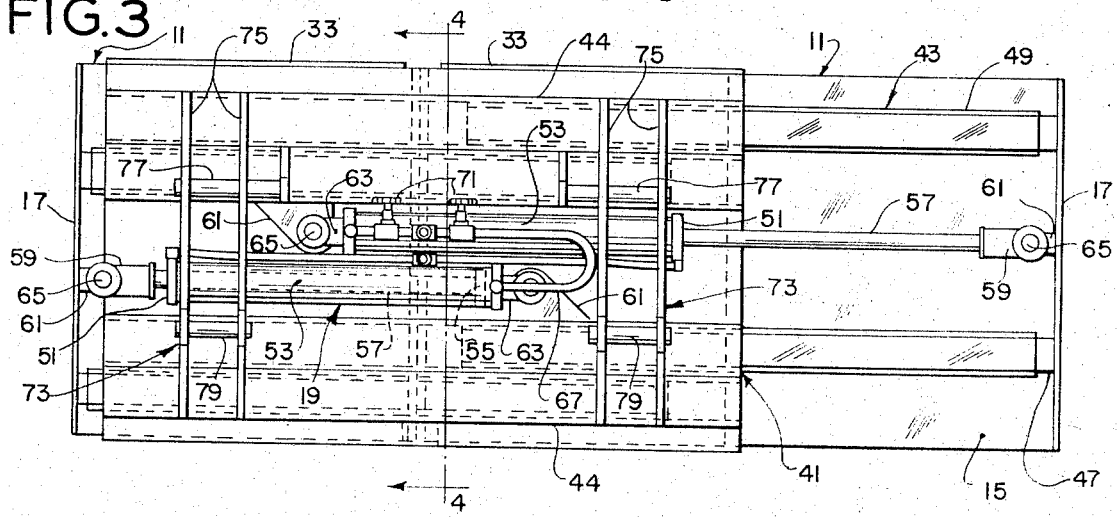
FIG. 3 is a rear elevation of the bucket as shown in FIG. 2.

Referring to FIGS. 3 and 4, the scoops 11 are guided as they move inwardly and outwardly between their extended and retracted positions by guide means, generally indicated at 41, secured to the back side of the main section back plate 9 and by guide following means, indicated at 43, secured to each scoop 11, engaging the guide means 41. More particularly, guide means 41 constitutes a plurality of horizontal guide tubes 44 each of generally rectangular cross section. The guide tubes are secured as by welding to the back side of main section back plate 9 and extend the length thereof. As shown in FIG. 3, there are four such guide tubes, two of which are arranged in contiguous relation at the upper portion of the back plate 9 the other two being arranged in contiguous relation at the bottom of the back plate 9. The guide following means 43 comprises a pair of horizontal guide rods 47 having a generally rectangular cross section secured as by welding to a rear portion 48 of end plate 17 of each scoop 11 which extends back beyond scoop plate 15. One of the guide rods 47 secured to each scoop is slidably telescoped in a corresponding upper guide tube 44 and the other guide rod 47 is slidably telescoped in a corresponding lower guide tube 44. The guide rods are set back from the back face of scoop back plate 15 a distance sufficient for the front face of the guide rods and the back face of the scoop back plate to clear the main section back plate 9 as the scoops are moved in and out relative to the main section. The guide rods 47 have slide shims 49 secured to their outer surfaces insuring a close sliding fit within the guide tube 44 to substantially confine the movement of the scoops to lateral inward and outward movement. The shim slides 49 may be made of brass or the like to facilitate sliding within the tubes 44. As shown in FIG. 3, the guide rods 47 extend inwardly well beyond the inner ends of the scoops for positively holding the scoops in their extended position.

Again referring to FIG. 3, means 19 for effecting movement of the side scoops 11 is shown to include a pair of horizontally disposed hydraulic cylinders, each indicated at 51, there being one hydraulic cylinder for each scoop. Each hydraulic cylinder 51 comprises a cylinder body 53 having a piston 55 (shown in dotted lines) with a piston rod 57 secured thereto and extending out of the outer end of the cylinder. The free end of each piston rod 57 is secured to its respective scoop by a clevis 59 engaging a mounting lug 61 welded to the scoop end plate rear portions 48. The other end of the cylinder is pivoted on to the main section back plate by a clevis 63 engaging another lug 61 welded to the lower face of a respective guide tube 44. Clevis fittings 59 and 63 are connected to lugs 61 by pins 65. The stroke of the hydraulic cylinders is sufficient to move the scoops between their retracted and extended positions. The hydraulic cylinders have hydraulic fluid lines 67 connected thereto for supplying the cylinders with hydraulic fluid under pressure from a hydraulic power source 69 on the loader 3. Two valves 71 are provided for controlling the operation of the respective cylinders so that the scoops 11 may be extended and retracted independently of one another.

As indicated at 73, means is provided on the back side of the main section back plate 9 for attaching the bucket to the loader 3. The attachment means constitutes mounting brackets, each indicated at 75, welded to the back of the guide tubes 44. The mounting brackets 75 are arranged in pairs with the brackets constituting each pair being spaced apart from one another to receive a portion of the loader. The pairs of brackets carry upper and lower mounting pins 77 and 79, respectively, for attaching the bucket to the loader as will be hereinafter described.

As shown in FIG. 1, the loader 3 is mounted on wheels 81 and has a conventional hydraulic high-lift unit, generally indicated at 83, mounted thereon. The high-lift unit comprises upright members 85 secured to the upper rear portion of the loader, and rigid offset lifting arms 87 pivotally connected to the upper ends of the upright members. The lifting arms 87 extend forward to the front of the loader and are bent downwardly to permit a bucket secured thereto to scrape along the ground when the lifting arms are in the position shown in FIG. 1. The bucket 1 is pivotally attached to the lifting arms 87 by the lower mounting pins 79. The lifting arms 87 and the bucket 1 may be raised by extending hydraulic cylinders 89. The bucket is restrained from rotating about the lower mounting pins 79 by hydraulic cylinders 91 which have their upper ends pin-connected to the lifting arms at 93 and their lower ends pivotally connected to the bucket by the upper mounting pins 77. By extending cylinders 91, the bucket will rotate downwardly about mounting pins 79 for dumping of the bucket. The loader has the hydraulic power source 69 mounted thereon for supplying pressurized hydraulic fluid to the high-lift cylinders 89 and 91 and to the scoop cylinders 51. A dual-acting control valve 95 for controlling the flow of hydraulic fluid through the hydraulic lines 67 to extend or retract the scoop cylinders 51 is mounted on the loader for operation by the driver.

In operation, the loader 3 with a bucket 1 attached to the high-lift unit 83 is driven between two adjacent rows of poultry cages 21. With the side scoops 11 in their retracted position, the bucket is lowered to contact the ground by retracting cylinders 89. The bucket is rotated by actuating cylinders 91 so that the bottom plate 7 of the bucket is substantially level with the ground. Control valve 95 is then actuated to extend the scoop hydraulic cylinders 51 to move both of the scoops 11 from their retracted to their extended positions to move scoops 11 underneath the overhanging cages 21 as shown in FIG. 5. The loader is then driven forward to scrape the litter from the ground into the scoops. Upon reaching the end of the rows of cages or upon filling the scoops, the control valve 95 is reversely operated to actuate the scoop hydraulic cylinders 51 to move the scoops inwardly from their extended positions to their retracted positions for loading the litter on the scoops onto the main section. The loaded bucket is then raised above the ground by extending cylinders 89 and the loader is then driven from between the cages to dump the litter. The bucket is dumped by extending the cylinders 91 to rotate the front of the bucket downwardly causing the litter therein to fall out of the bucket. If litter beneath only a single row of cages is to be removed, the corresponding valve 71 is closed to block the flow of hydraulic fluid into the cylinder 51 attached to the scoop 11 which is not needed. Thus, upon actuation of control valve 95, only one scoop will be extended to reach underneath the single row of cages.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A bucket for use on a loader, tractor or the like, comprising a main section having a bottom plate and a back plate extending up from the back edge of the bottom plate, a side scoop on each lateral side of the main section, each said side scoop having a bottom plate, a back plate extending up from the bottom plate, and an outer end plate extending up from the bottom plate and forward from the back plate, and means mounting each side scoop for sliding movement thereof laterally inward and outward relative to the main section between a retracted position wherein the bottom plate of a respective scoop overlies the main section bottom plate, the scoop back plate lies in front of the back plate of the main section, and the outer end plate is adjacent a respective lateral side of the main section, and an extended position wherein the innermost portion of the bottom plate of the scoop overlies the main section bottom plate, the innermost portion of the scoop back plate lies in front of the main section back plate, and the outer end wall of the scoop lies laterally outward from its respective main section lateral side, and power means mounted on the back side of the back plate of the main section for moving said scoops laterally inward and outward relative to the main section between their said retracted and extended positions.

2. A bucket as set forth in claim 1 wherein said power means for moving said scoops is operable for moving one or both of said scoops between their respective retracted and extended positions.

3. A bucket as set forth in claim 1 wherein said power means for moving said scoops comprises hydraulic cylinder means secured to the back side of said main section back plate, there being one said hydraulic cylinder means for each scoop, and each said hydraulic cylinder means having a piston and piston rod for effecting in and out lateral movement of a respective scoop between its retracted and extended positions.

4. A bucket as set forth in claim 1 wherein said main bucket section has means secured to the back of said main section back plate for attaching said bucket to said loader.

5. A bucket as set forth in claim 1 wherein said mounting means for the side scoops comprises guide means secured to the back side of said main bucket back plate for guiding said scoops as they are moved between their retracted and extended positions.

6. A bucket as set forth in claim 5 wherein each said side scoop has guide following means engaging said guide means for guiding the scoop as it is moved between its extended and retracted positions.

7. A bucket as set forth in claim 6 wherein each said scoop outer end plate extends back beyond its respective scoop back plate and wherein said guide following means comprises a plurality of guide rod members secured to said end plate back portion extending inwardly toward the main bucket section, said rod members being disposed to lie behind said main section back plate and to engage said guide means.

8. A bucket as set forth in claim 7 wherein said guide means comprises a plurality of horizontally disposed tubes secured to the back side of said main section back plate, said guide rods having a sliding fit therein.

9. A bucket as set forth in claim 8 wherein said power means for moving said scoops comprises a pair of hydraulic cylinders, one for each scoop, having a cylinder body with a piston and a piston rod mounted therein for in and out movement, said cylinder body being pin-connected to the back side of said main section back wall and the free end of said piston rod being pin-connected to the outer portion of its respective scoop adjacent the rearward extending portion of its said outer end wall, and each cylinder having sufficient stroke to permit the movement of the respective scoop between its extended and retracted position.

10. A bucket as set forth in claim 9 wherein said guide rods have inner portions which extend inwardly beyond the inner edge of said scoops.

11. A bucket for use on a loader, tractor or the like, comprising a main section having a bottom plate and a back plate extending up from the back edge of the bottom plate, a side scoop on each lateral side of the main section, each said side scoop having a bottom plate, a back plate extending up from the bottom plate, and an outer end plate extending up from the bottom plate and forward from the back plate, and means mounting each side scoop for effecting sliding movement laterally inward and outward relative to the main section between a retracted position wherein the bottom plate of a respective scoop overlies the main section bottom plate, the scoop back plate lies in front of the back plate of the main section, and the outer end plate is adjacent a respective lateral side of the main section, and an extended position wherein the innermost portion of the bottom plate of the scoop overlies the main section bottom plate, the innermost portion of the scoop back plate lies in front of the main section back plate, and the outer end wall of the scoop lies laterally outward from its respective main section lateral side, said main section bottom plate having inclined means at its front edge extending forward beyond the front edge of said scoop bottom plates and inclining upwardly and rearwardly for engaging the upper front portion of said scoop bottom plates for holding the scoop bottom plate in its said overlying position relative to said main section bottom plate.

12. A bucket as set forth in claim 11 wherein the main section back plate has means at its upper edge which extends up above the upper edge of said scoop upper edge and which is adapted to engage the upper front surface of said scoop back plate for holding the scoop in close spaced relation in front of said main section back plate.

* * * * *